Sept. 7, 1965   M. M. KNAPP   3,204,274
PIPE LINE PLUG DEVICE
Filed Dec. 24, 1962

Mary M. Knapp
INVENTOR.

BY

ATTORNEYS

United States Patent Office 3,204,274
Patented Sept. 7, 1965

3,204,274
PIPE LINE PLUG DEVICE
Mary M. Knapp, Houston, Tex., assignor, by mesne assignments, of one-half to Harry J. Girard and one-half to Mary M. Knapp
Filed Dec. 24, 1962, Ser. No. 246,722
3 Claims. (Cl. 15—104.06)

This invention relates to means and method of cleaning pipe lines and more particularly to pipe line plugs or swipes which are propelled through the interior of a pipe line.

Heretofore, pipe line cleaning devices of the plug or swipe type which are propelled through a pipe line by a pressure differential have either utilized a rigid body assembly such as that in U.S. Patent 1,325,348, a flexible body assembly such as that in U.S. Patent 2,906,650, or a soluble body assembly such as that in U.S. Patent 2,744,880.

One of the disadvantages of the rigid pipe line plug is its tendency to stick or jam when it reaches obstructions in the pipe to be cleaned. Although flexible pipe line plugs generally do not jam in the pipe line, because of the nature of the material of which they are constructed, the surface of the plug or swipe contacting the pipe generally does not do a sufficient job of abrading the interior of the pipe.

Soluble body type pipe line plugs must be specially designed and constructed to be soluble in the particular fluid used to propel the plug through the interior of the pipe and therefore are expensive and impractical.

It is an object of this invention to provide a durable, inexpensive pipe line plug which is flexible to resist jamming in the pipe, and which provides an abrasive surface for contact with the interior of the pipe.

It is a further object of this invention to provide an abrasive type flexible pipe line plug which will create an effective seal with the interior of the pipe during use to minimize liquid or gas flow around the plug and a loss of the liquid or gas's propelling force.

Other objects of the invention will be apparent to one skilled in the art from a study of the specification and attached drawings.

The pipe line plug of the present invention comprises a relatively smooth surfaced springy cylindrical body member having an abrasive helically disposed around its outer surface between the leading and trailing end of the plug.

Figure 2:
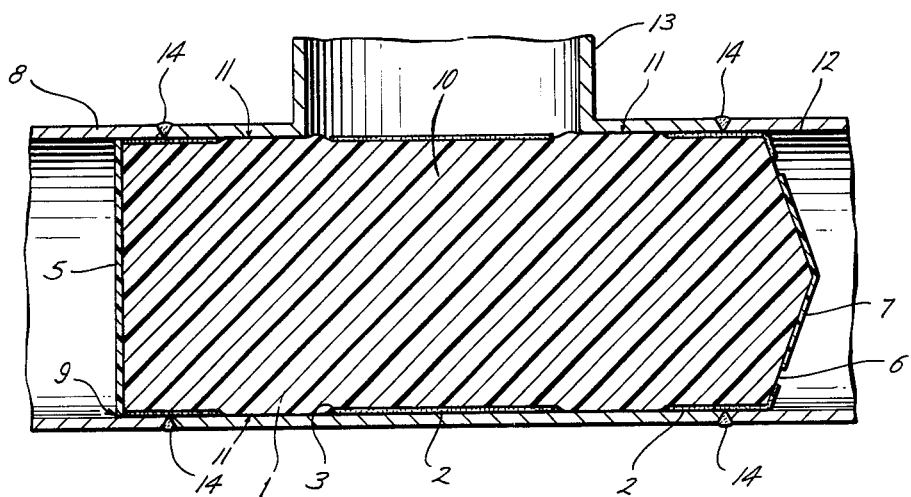
FIG. 2 is a section view along line 2—2 of FIG. 1 and illustrating carriage of the invention in a T-joint of pipe. Although specific terms are used in the following description for clarity and to aid in the disclosure of one embodiment of the invention, they are not intended, nor should they be construed to limit the scope or define the invention.

In the illustrated embodiment the springy molded cylindrical polyurethane body member 1, which may conveniently be constructed of a rubber, or other suitable material, has helically disposed about its outer surface an abrasive material 2. The abrasive material 2 may conveniently be sand, glass, diamond dust, silicone carbide, short bristles, a fine rouge type material, or any combination or equivalent of the mentioned materials. Securing the abrasive material to the body member 1, is a binding material 3 which may conveniently be an epoxy or other suitable material.

Across the flat trailing end 4 of the body member 1 there is provided a relatively non-permeable membrane 5 which may be constructed of a soft material possessing elastomeric qualities.

There is secured to the rounded leading edge 6 of the body member 1 a coating 7 which may conveniently be of the same material as that used for membrane 5.

Figure 1:
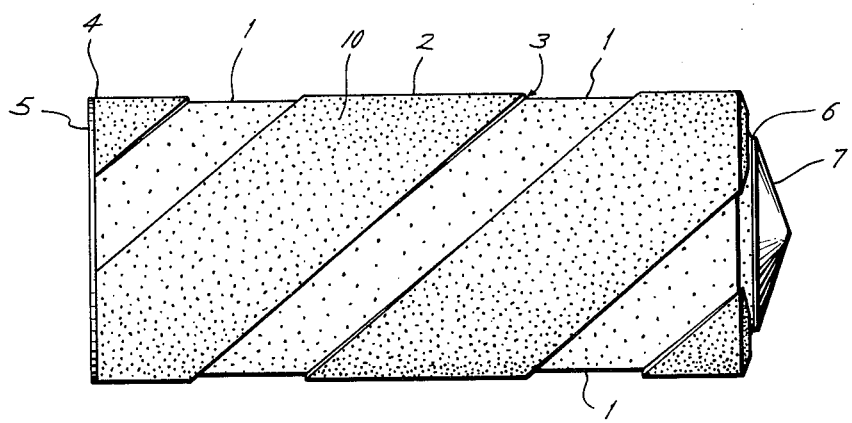
FIG. 1 is a side view of a pipe line plug.

To clean the interior of a pipe line, a pipe line plug preferably having a greater diameter than that of the interior of the pipe to be cleaned is inserted into an open end of the pipe and a liquid or gas pressure is exerted on the membrane 5. Referring to FIG. 1, membrane 5, because of its elastomeric qualities will, upon being inserted into the pipe 8, create a seal with the interior of pipe 8 as shown at 9. As the liquid or gas pressure imposed upon membrane 5 propels the pipe line plug 10 through the interior of the pipe 8, the helically disposed abrasive 2, because of its frictional engagement of pipe 8, will cause the plug 10 to commence a rifling action. This rifling action together with the pressure applied on membrane 5, and the resistance between the abrasive 2 and interior of the pipe 8, will tend to rotatably compress the pipe line plug causing the springy material of which body member 1 is constructed to expand between turns of the abrasive 2 and create a seal between body member 1 and the pipe 8 as shown at surfaces 11 in FIG. 1. The seal created by body member 1 will both resist the loss of the liquid or gas driving force behind the pig by resisting flow of the liquid or gas which may pass around membrane 5, and present a smooth surface to the interior of the pipe 8 for wiping of the interior. Thus, as the pipe line plug passes any point in the pipe, such as point 12 shown in FIG. 1, point 12 will be successively abraded and wiped, the number of times the spot is abraded and wiped depending upon the number of turns of abrasive between the leading end 6 and trailing end 4 of the pipe line plug 10.

The greater the resistance between the leading end 6 and accumulations in the pipe 8, the more rotatably compressed body member 1 will become, and the tighter the seal will be between the body member 1 and the pipe 8. Thus, as accumulations in the pipe 8 increase resistance to flow of the pipe line plug 10, the liquid or gaseous propelling force will become more effective because a tighter seal will be formed between the body member 1 and the interior of pipe 8. A coating 7 is provided on the leading end 6 of the body member 1 to prevent debris and particles in the pipe from accumulating in the open pores formed in the leading end 6 during the molding process of polyurethane body member 1.

The perimetric surface of body member 1 between turns of abrasive 2 is formed during the molding process of body member 1 into a relatively smooth surface and therefore will not collect debris and particles abraded from the interior of pipe 8.

It will also be apparent that the body member 1 will be compressed longitudinally under the influence of the pressure gradient in the pipe line tending to shorten the axial length of the abrasive band 2, to thereby increase the pressure of the abrasive exerted radially outwardly against the surrounding wall of the pipe.

It has been determined that for the best combination of abrasive and flexible features in a pipe line plug such as that illustrated in FIG. 2, the width of the abrasive 2 disposed around main body member 1 should be approximately equal to the width of body member 1 between a turn of abrasive 2.

Because of the springy properties of the body member 1, the pipe line plug can be utilized to clean pipes having constrictions, L's, U-bends, valves, and T's. For example, FIG. 1 illustrates a pipe line plug passing through T 13 which has been welded into pipe 8 at points 14.

It will be apparent that the embodiment shown and described illustrates but does not limit the invention and that various changes and modifications can be made therein without departing from the scope of the invention as defined in the appended claims.

For example, the abrasive material may be either disposed in the surface of the springy body member or it may be disposed upon the surface by an adhesive material. It is also apparent that the pipe line plug may be used as a barrier to separate different type liquids or gases, and thus serve a two fold purpose. It is equally apparent that a springy body member may be constructed of a material which will eliminate the need of a relatively non-permeable membrane because the body member will be impervious to the flow of the liquid or gas.

I claim:

1. For use as a pipe line plug propelled through the interior of a pipe by a pressure gradient, a molded cylindrical polyurethane body member, means on the body positioned for engagement with the surrounding wall of the pipe to apply a force to the body member tending to compress the member longitudinally under the influence of said pressure gradient; and a band of abrasive helically carried about said body member, the springy property of said body member and pitch of said abrasive being such that said body member is adapted to be compressed longitudinally under the influence of said pressure to apply a force to said band tending to shorten the axial length of the band to increase the pressure exerted by the band radially outwardly against the surrounding wall of the pipe.

2. For use as a pipe line plug propelled through the interior of a pipe by a pressure gradient, a molded cylindrical body of resilient, compressible material having a leading and a trailing end, means on the body positioned for sealing engagement with the surrounding wall of a pipe to close the pipe against the flow of fluid therethrough past the body; and a helical band extending about the body in position for engagement with the surrounding wall of the pipe between the body and wall, said body being compressible longitudinally under the influence of said pressure gradient to shorten the axial length of the band to increase the pressure exerted by the band radially outwardly against said wall.

3. For use as a pipe line plug propelled through the interior of a pipe by a pressure gradient, a molded cylindrical polyurethane body member having a leading and trailing end, means on said trailing end formed of a relatively non-permeable material positioned for engagement with the surrounding wall of the pipe to close the pipe against the flow of fluid therethrough past the body member; and a band of abrasive helically carried by said body member, the springy property of said body member and pitch of said abrasive being such that said body member is adapted to be contracted longitudinally under the influence of said pressure gradient to apply an axial force to said band to increase the force exerted by the band radially outwardly against the surrounding wall of the pipe.

References Cited by the Examiner

UNITED STATES PATENTS

| | | | |
|---|---|---|---|
| 864,544 | 8/07 | Kessler | 15—104.06 |
| 1,547,440 | 7/25 | Penn | 15—104.06 |
| 1,597,850 | 8/26 | Weis | 15—104.06 |
| 1,634,094 | 6/27 | Cook et al. | 15—104.06 |
| 1,673,890 | 6/28 | Smith | 15—104.06 |
| 2,874,078 | 2/59 | Reinhart | 134—8 |
| 2,906,650 | 9/59 | Wheaton | 15—104.06 X |

FOREIGN PATENTS

| | | |
|---|---|---|
| 522,895 | 4/31 | Germany. |
| 483,941 | 4/38 | Great Britain. |

CHARLES A. WILLMUTH, *Primary Examiner.*